(12) United States Patent
La Camera et al.

(10) Patent No.: US 9,371,426 B2
(45) Date of Patent: Jun. 21, 2016

(54) COMPOSITIONS HAVING IMPROVED TRIBOLOGICAL PROPERTIES, METHODS OF MANUFACTURE THEREOF AND ARTICLES COMPRISING THE SAME

(75) Inventors: Domenico La Camera, Breda (NL); Alexis Chopin, Saint Maximin (FR); Andre Kijkuit, Raamsdonksveer (NL)

(73) Assignee: SABIC GLOBAL TECHNOLOGIES B.V. (NL)

( * ) Notice: Subject to any disclaimer, the term of this patent is extended or adjusted under 35 U.S.C. 154(b) by 881 days.

(21) Appl. No.: 12/329,676

(22) Filed: Dec. 8, 2008

(65) Prior Publication Data

US 2010/0144916 A1    Jun. 10, 2010

(51) Int. Cl.
*C08J 3/28* (2006.01)
*C08J 3/24* (2006.01)
*F16D 69/02* (2006.01)

(52) U.S. Cl.
CPC .... *C08J 3/24* (2013.01); *C08J 3/28* (2013.01); *F16D 69/025* (2013.01); *F16D 2300/10* (2013.01)

(58) Field of Classification Search
CPC ............. C08J 3/24; C08J 3/28; F16D 69/025; F16D 2300/10
USPC ................. 522/137, 138, 136, 117, 129, 115; 528/332–353, 322, 323, 271
See application file for complete search history.

(56) References Cited

U.S. PATENT DOCUMENTS

| | | | |
|---|---|---|---|
| 3,808,129 A | | 4/1974 | Lindlof |
| 4,400,519 A * | | 8/1983 | Hagiwara et al. ............. 548/461 |
| 4,539,393 A * | | 9/1985 | Tamura et al. ................ 528/348 |
| 5,274,049 A | | 12/1993 | Zielinski et al. |
| 5,411,663 A | | 5/1995 | Johnson |
| 5,504,139 A * | | 4/1996 | Davies et al. ................. 524/504 |
| 5,684,088 A | | 11/1997 | Miyamori et al. |
| 5,993,415 A * | | 11/1999 | O'Neil et al. ............. 604/96.01 |
| 5,998,551 A | | 12/1999 | O'Neil et al. |
| 6,064,002 A * | | 5/2000 | Hayami et al. ................ 174/564 |
| 6,093,463 A * | | 7/2000 | Thakrar ........................ 428/36.9 |
| 6,168,626 B1 * | | 1/2001 | Hyon et al. ................ 623/18.11 |
| 6,340,528 B1 | | 1/2002 | Hsieh et al. |
| 6,399,714 B1 | | 6/2002 | Huang et al. |
| 6,887,938 B2 * | | 5/2005 | Atkinson ....................... 525/132 |
| 7,423,080 B2 * | | 9/2008 | Cartier et al. ................. 524/126 |
| 7,595,285 B2 * | | 9/2009 | Ota et al. ...................... 508/100 |
| 2004/0082725 A1 | | 4/2004 | Mabushi et al. |

FOREIGN PATENT DOCUMENTS

EP    0729981 A1    9/1996
JP    2006056984    3/2006

OTHER PUBLICATIONS

J.K.Katta, et al. "Friction and Wear Behavior of Poly(vinyl alcohol)/Poly (vinyl pyrrolidone) Hydrogels for Articular Cartilage Replacement" InterScience (2007); pp. 471-479; Wiley Periodicals, Inc.
N. Maeda, et al. "Adhesion and Friction Mechanisms of Polymer-on-Polymer Surfaces"; Science (Jul. 19, 2002); pp. 379-382; vol. 297; Sciencemag.org.
Y.M.Pleskachevskii, et al. "Increasing Wear Resistance in Polymer-Based Composites Using Radiation-Modified Polymeric Additives." Wear (1993); pp. 426-431; Elsevier Sequoia.
VP Bavaresco, et al. "Study on teh Tribological Properties of pHEMA Hydrogels for Use in Artificial Articular Cartilage" Wear (2008); pp. 269-277; Science Direct; Elsevier B.V.
International Search Report dated Mar. 29, 2010 for International Application No. PCT/IB2009/055193.
Written Opinion of the International Searching Authority dated Mar. 29, 2010 for International Application No. PCT/IB2009/055193.
Arkema Group Pebax MX 1283 Polyether Block Amide PEBA Dry, Matweb.com, pp. 1 of 1 -Appendix A.

* cited by examiner

*Primary Examiner* — Sanza McClendon
(74) *Attorney, Agent, or Firm* — Cantor Colburn LLP

(57) ABSTRACT

Disclosed herein is a composition comprising a crosslinked organic polymer; wherein the composition has a coefficient of friction that is in a range of ±30% of a coefficient of friction for a composition comprising the same organic polymer that is not crosslinked; and wherein the composition has a lower K factor than a K factor of the composition comprising the same organic polymer that is not crosslinked; the coefficient of friction and the K factor being measured in a thrust washer apparatus as per ASTM D-3702, where the counter stationary surface in the thrust washer apparatus comprises carbon steel having a Rockwell C hardness of 18 to 22 and a 12 to 16 micro-inch surface finish.

20 Claims, 1 Drawing Sheet

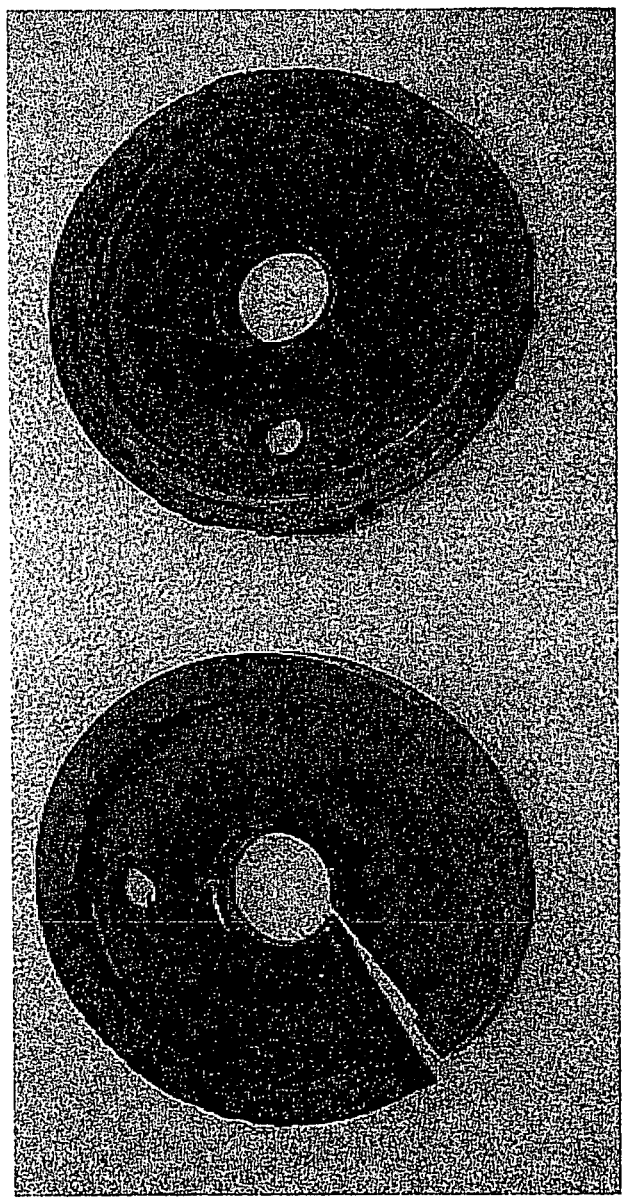

COMPOSITIONS HAVING IMPROVED TRIBOLOGICAL PROPERTIES, METHODS OF MANUFACTURE THEREOF AND ARTICLES COMPRISING THE SAME

BACKGROUND

This disclosure relates to compositions having improved tribological properties, methods of manufacture thereof and to articles comprising the same.

Organic polymers are often used in applications involving the transmission of force or energy (e.g., the transmission of torque, the transmission of motion, and the like) where they are subjected to friction. Friction brings about mechanical abrasion. It is desirable for organic polymers to display as high abrasion resistance as possible. However, most polymers display poor abrasion resistance when subjected to friction at moderate pressures and at moderate sliding velocities that are generally employed in such frictional applications.

In order to reduce damage by mechanical abrasion, lubricants are often added to the organic polymer. Lubricants decrease the coefficient of friction and in turn improve wear resistance. However, the addition of lubricants has several drawbacks. In particular, in applications where force or torque needs to be transmitted, a high coefficient of friction is desirable because it allows for higher efficiency in the transmission of these forces. Lubricants have the effect of decreasing the coefficient of friction and therefore cannot be used in these applications. It is further desirable to have an organic polymeric composition that can display resistance to catastrophic failure when used in frictional applications that use high pressure and high velocities.

SUMMARY

Disclosed herein is a composition comprising a crosslinked organic polymer; wherein the composition has a coefficient of friction that is in a range of ±30% of a coefficient of friction for a composition comprising the same organic polymer that is not crosslinked; and wherein the composition has a lower K factor than a K factor of the composition comprising the same organic polymer that is not crosslinked; the coefficient of friction and the K factor being measured in a thrust washer apparatus as per ASTM D-3702, where the counter stationary surface in the thrust washer apparatus comprises carbon steel having a Rockwell C hardness of 18 to 22 and a 12 to 16 micro-inch surface finish.

Disclosed herein too is a composition comprising a crosslinked organic polymer; wherein the composition does not undergo catastrophic failure for a period of about 1 to about 48 hours when tested in a thrust washer apparatus as per ASTM D-3702, where the counter stationary surface in the thrust washer apparatus comprises carbon steel having a Rockwell C hardness of 18 to 22 and a 12 to 16 micro-inch surface finish, where the composition is subjected to a pressure of about 2 to about 400 pounds per square inch and a linear velocity of about 20 to about 400 feet per minute during the test in the thrust washer apparatus.

Disclosed herein too is a method comprising crosslinking an organic polymer; the crosslinking being effective to produce a composition that has a coefficient of friction that is similar to a coefficient of friction for a composition comprising the same organic polymer that is not crosslinked; and wherein the composition has a lower K factor than a K factor of the composition comprising the same organic polymer that is not crosslinked; the coefficient of friction and the K factor being measured in a thrust washer apparatus as per ASTM D-3702, where the counter stationary surface in the test equipment is comprises carbon steel having a Rockwell C hardness of 18 to 22 and a 12 to 16 micro-inch surface finish.

Disclosed herein too is a method comprising crosslinking an organic polymer; the crosslinking being effective to produce a composition that does not undergo catastrophic failure for a period of about 1 to about 48 hours when tested in a thrust washer apparatus as per ASTM D-3702, where the counter stationary surface in the thrust washer apparatus comprises carbon steel having a Rockwell C hardness of 18 to 22 and a 12 to 16 micro-inch surface finish, where the composition is subjected to a pressure of about 2 to about 400 pounds per square inch and a linear velocity of about 20 to about 400 feet per minute during the test in the thrust washer apparatus.

Disclosed herein too is a method comprising crosslinking an organic polymer; the crosslinking being effective to produce a composition that has a coefficient of friction that is similar to a coefficient of friction for a composition comprising the same organic polymer that is not crosslinked; and wherein the composition has a lower K factor than a K factor of the composition comprising the same organic polymer that is not crosslinked; the coefficient of friction and the K factor being measured in a thrust washer apparatus as per ASTM D-3702, where the counter stationary surface in the test equipment is comprises carbon steel having a Rockwell C hardness of 18 to 22 and a 12 to 16 micro-inch surface finish; and subjecting the composition to friction.

BRIEF DESCRIPTION OF THE FIGURES

FIG. 1 is a photograph showing the cracked non-crosslinked sample and the crosslinked sample next to it with no visible damage.

DETAILED DESCRIPTION

The terms "first," "second," and the like, "primary," "secondary," and the like, as used herein do not denote any order, quantity, or importance, but rather are used to distinguish one element from another.

The terms "a" and "an" do not denote a limitation of quantity, but rather denote the presence of at least one of the referenced item.

All ranges disclosed herein are inclusive of the endpoints, and the endpoints are independently combinable with each other.

Disclosed herein are compositions that comprise crosslinked organic polymers that can be used in frictional applications. Articles manufactured from the crosslinked organic polymers can resist high pressure and sliding velocities when compared with articles manufactured from non-crosslinked organic polymers. The crosslinked organic polymers show greater abrasion resistance than non cross-linked organic polymers. In an exemplary embodiment, the crosslinked organic polymers are polyamides.

Articles manufactured the composition generally show a lower K factor than a comparative composition that contains a non-crosslinked polymer. This generally results in improved wear performance and improved life cycles for pieces of equipment that use the composition in frictional applications.

In one embodiment, the composition has a coefficient of friction that is in a range of ±30%, specifically in the range of ±20%, and specifically in the range of ±10% of a coefficient of friction for a composition comprising the same organic polymer that is not crosslinked. The composition generally has a K factor (also known as the "volumetric wear rate", the "wear coefficient", or the "abrasion factor") than a K factor of the composition comprising the same organic polymer that is not crosslinked; the coefficient of friction and the K factor both being measured in a thrust washer apparatus as per ASTM D-3702, where the counter stationary surface in the thrust washer apparatus comprises carbon steel having a Rockwell C hardness of 18 to 22 and a 12 to 16 micro-inch surface finish. In an exemplary embodiment, the composition has a coefficient of friction that is about the same as the coefficient of friction for a composition comprising the same organic polymer that is not crosslinked, while at the same time displaying a lower K factor than the composition comprising the same organic polymer that is not crosslinked.

The K factor is given in Equation (1) below:

$$K=W/(F*D) \quad (1)$$

where W is the volume of material abraded from the test specimen, F is the perpendicular load and D is the distance of sliding.

The composition is further advantageous in that an article manufactured from the composition does not undergo catastrophic failure when tested in a thrust washer apparatus as per ASTM D-3702, when subjected to a pressure of about 2 to about 400 pounds per square inch and a linear velocity of about 20 to about 400 feet per minute for a period of about 1 hour to about 48 hours. Catastrophic failure as defined herein is a sudden inability to perform an operation that an article manufactured from the composition hitherto could successfully perform.

In another embodiment, an article manufactured from the composition performs continuously for a period of about 1 to about 48 hours when tested in a thrust washer apparatus as per ASTM D-3702, where the counter stationary surface in the thrust washer apparatus comprises carbon steel having a Rockwell C hardness of 18 to 22 and a 12 to 16 micro-inch surface finish and where the article is subjected to a pressure of about 2 to about 400 pounds per square inch and a linear velocity of about 20 to about 400 feet per minute during the test in the thrust washer apparatus.

In yet another embodiment, the article manufactured from the composition performs continuously for a period of about 16 to about 30 hours when the composition is subjected to a pressure of about 20 to about 80 pounds per square inch and a linear velocity of about 40 to about 200 feet per minute during the test in the aforementioned thrust washer apparatus as per ASTM D-3702. In yet another embodiment, the article manufactured from the composition performs continuously for a period of about 20 to about 28 hours when the composition is subjected to a pressure of about 40 to about 60 pounds per square inch and a linear velocity of about 100 to about 150 feet per minute during the test in the aforementioned thrust washer apparatus as per ASTM D-3702.

As noted above the composition comprises crosslinked organic polymers. In one embodiment, it is generally desirable for the crosslinked organic polymers to be below their glass transition temperatures at the initial temperature of the frictional application. In one embodiment, it is generally desirable for the crosslinked organic polymers to be below their melting temperatures at the initial temperature of the frictional application. Examples of suitable organic polymers that can be crosslinked are blends of polymers, copolymers, terpolymers, or combinations comprising at least one of the foregoing organic polymers. The organic polymer can also be an oligomer, a homopolymer, a copolymer, a block copolymer, an alternating block copolymer, a random polymer, a random copolymer, a random block copolymer, a graft copolymer, a star block copolymer, a dendrimer, or the like, or a combination comprising at last one of the foregoing organic polymers prior to crosslinking.

Examples of organic polymers that can be crosslinked are polyacetals, polyolefins, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polysiloxanes, or the like, or a combination comprising at least one of the foregoing thermoplastic polymers.

In an exemplary embodiment, the thermoplastic polymer is a polyamide or a copolyamide (e.g., a polyamideimide).

Examples of blends of polymers that can be crosslinked include acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/elastomers, polyester/elastomers, polyethylene terephthalate/polybutylene terephthalate, acetal/elastomer, styrene-maleic anhydride/acrylonitrile-butadiene-styrene, polyether etherketone/polyethersulfone, polyether etherketone/polyetherimide polyethylene/nylon, polyethylene/polyacetal, or the like.

As noted above, exemplary organic polymers that can be crosslinked to form the composition are polyamides. Polyamides are generally derived from the polymerization of organic lactams having from 4 to 12 carbon atoms. Exemplary lactams are represented by the formula (I)

wherein n is about 3 to about 11. An exemplary lactam is epsilon-caprolactam having n equal to 5.

In one embodiment, the polyamide can be synthesized using an α,β-unsaturated gamma-lactone (such as 2(5H-furanone) to effect the regular, sequential alignment of side chains along a polyamide backbone as shown in the formula (II) below.

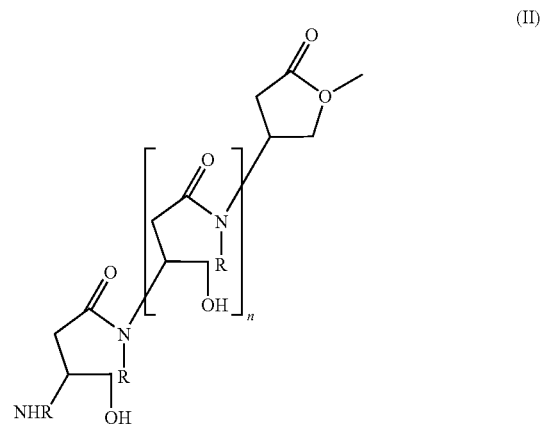

wherein n is about 50 to about 10,000, wherein each R is 1 to about 50 carbon atoms and is optionally substituted with heteroatoms, oxygen, nitrogen, sulfur, or phosphorus and combinations thereof. Depending on the side group (R), the method can produce many different types of polyamides. For instance, when R is a saturated long-chain alkyl group (such as when the amine is tetradecylamine), a polymer having alkyl chains on one side of the polymer backbone and hydroxymethyl groups on the other side of the backbone is formed. When the R group is a polyamine (such as pentaethylenehexamine), a polymer having amino substituted alkyl chains on one side of the polymer backbone and hydroxymethyl groups on the other side of the backbone is formed.

Polyamides may also be synthesized from amino acids having about 4 to about 12 carbon atoms. Exemplary amino acids are represented by the formula (III)

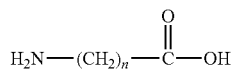
(III)

wherein n is about 3 to about 11. An exemplary amino acid is epsilon-aminocaproic acid with n equal to about 5.

Polyamides may also be polymerized from aliphatic dicarboxylic acids having from about 4 to about 12 carbon atoms and aliphatic diamines having from about 2 to about 12 carbon atoms.

Exemplary aliphatic diamines are represented by the formula (IV)

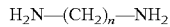
(IV)

wherein n is about 2 to about 12. An exemplary aliphatic diamine is hexamethylenediamine ($H_2N(CH_2)_6NH_2$). It is desirable for the molar ratio of the dicarboxylic acid to the diamine to be about 0.66 to about 1.5. In one embodiment, it is desirable to use molar ratios of about 0.81 to about 1.22. In another embodiment, it is desirable to use molar ratios of about 0.96 to about 1.04.

The dicarboxylic acids can be aliphatic dicarboxylic acids, cycloaliphatic dicarboxylic acids, or aromatic dicarboxylic acids. Examples of aliphatic dicarboxylic acids are aliphatic diacids that include carboxylic acids having two carboxyl groups. Suitable examples of cycloaliphatic acids include decahydro naphthalene dicarboxylic acid, norbornene dicarboxylic acids, bicyclo octane dicarboxylic acid, cis-1,4-cyclohexanedicarboxylic acid and trans-1,4-cyclohexanedicarboxylic acids or the like, or a combination comprising at least one of the foregoing acids. Exemplary cycloaliphatic diacids are cis-1,4-cyclohexanedicarboxylic acid and trans-1,4-cyclohexanedicarboxylic acids. Examples of linear aliphatic diacids are oxalic acid, malonic acid, pimelic acid, gluteric acid, suberic acid, succinic acid, adipic acid, dimethyl succinic acid, azelaic acid, or the like, or a combination comprising at least one of the foregoing acids. Examples of aromatic dicarboxylic acids are terephthalic acid, phthalic acid, isophthalic acid, naphthalene dicarboxylic acid, or the like, or a combination comprising at least one of the foregoing dicarboxylic acids.

Exemplary polyamides comprise polypyrrolidone (nylon-4), polycaprolactam (nylon-6), polycapryllactam (nylon-8), polyhexamethylene adipamide (nylon-6,6), polyundecanolactam (nylon-11), polydodecanolactam (nylon-12), polyhexamethylene azelaiamide (nylon-6,9), polyhexamethylene sebacamide (nylon-6,10), polyhexamethylene isophthalamide (nylon-6,I), polyhexamethylene terephthalamide (nylon-6,T), polyamides of hexamethylene diamine and n-dodecanedioic acid (nylon-6,12), as well as polyamides resulting from terephthalic acid and/or isophthalic acid and trimethyl hexamethylene diamine, polyamides resulting from adipic acid and meta xylenediamines, polyamides resulting from adipic acid, azelaic acid and 2,2-bis-(p-aminocyclohexyl)propane, polyamides resulting from terephthalic acid and 4,4'-diamino-dicyclohexylmethane, and combinations comprising one or more of the foregoing polyamides. The composition may comprise two or more polyamides. For example the polyamide may comprise nylon-6 and nylon-6,6.

Copolymers of the foregoing polyamides are also suitable for use in the practice of the present disclosure. Exemplary polyamide copolymers comprise copolymers of hexamethylene adipamide/caprolactam (nylon-6,6/6), copolymers of caproamide/undecamide (nylon-6/11), copolymers of caproamide/dodecamide (nylon-6/12), copolymers of hexamethylene adipamide/hexamethylene isophthalamide (nylon-6,6/6,I), copolymers of hexamethylene adipamide/hexamethylene terephthalamide (nylon-6,6/6,T), copolymers of hexamethylene adipamide/hexamethylene azelaiamide (nylon-6,6/6,9), and combinations thereof.

Polyamides, as used herein, also comprise the toughened or super tough polyamides. Generally, these super tough nylons are prepared by blending one or more polyamide with one or more polymeric or copolymeric elastomeric toughening agent. Suitable toughening agents can be straight chain or branched as well as graft polymers and copolymers, including core-shell graft copolymers, and are characterized as having incorporated therein either by copolymerization or by grafting on the preformed polymer, a monomer having functional and/or active or highly polar groupings capable of interacting with or adhering to the polyamide matrix so as to enhance the toughness of the polyamide polymer.

The polyamides can be crosslinked by a number of different means including thermally induced crosslinking, radiation induced crosslinking, or a combination comprising at least one of the foregoing methods of crosslinking. An exemplary method of crosslinking involves the use of radiation-induced crosslinking. A crosslinking agent can be added to the composition in order to facilitate crosslinking. Crosslinking accelerators, crosslinking initiators, crosslinking inhibitors, or the like, can be added to the composition to control the amount of crosslinking. It is desirable for the crosslinking agent to contain at least two functional groups capable of reacting with the amino groups of the polyamide.

The crosslinking agents can be a cyanurate crosslinking agent, an isocyanate crosslinking agent, a polyaldehyde crosslinking agent, a phosphine crosslinking agent, an epoxy crosslinking agent, or the like, or a combination comprising at least one of the foregoing crosslinking agents.

Examples of cyanurate crosslinking agents are triallyl cyanurate, triallyl isocyanurate, or the like, or a combination comprising at least one of the foregoing cyanurate crosslinking agents.

Suitable isocyanate crosslinking agents are monomeric or oligomeric molecules having 2 or more —N=C=O groups. Typically, the —N=C=O groups will crosslink the polyamide between both hydroxyl (—OH) groups and amino (—$NH_2$ or —NH—) groups on the polyamide. Polyisocyanate compounds useful for crosslinking the polyamide include aliphatic and aromatic isocyanate compounds having an isocyanate functionality of at least 2. The polyisocyanate compounds can also contain other substituents which do not substantially adversely affect the reactivity of the —N=C=O groups during crosslinking of the polyamide. The polyisocyanate compound can also comprise mixtures of both aromatic and aliphatic isocyanates and isocyanate compounds having both aliphatic and aromatic character.

Examples of polyisocyanate crosslinking agents include ethylene diisocyanate, ethylidene diisocyanate, propylene diisocyanate, butylene diisocyanate, hexamethylene diisocyanate, toluene diisocyanate, cyclopentylene-1,3,-diisocyanate, cyclohexylene-1,4-diisocyanate, cyclohexylene-1,2-diisocyanate, 4,4'-diphenylmethane diisocyanate, 2,2-diphenylpropane 4,4'-diisocyanate, p-phenylene diisocyanate, m-phenylene diisocyanate, xylylene diisocyanate, 1,4-naphthalene diisocyanate, 1,5-naphthalene diisocyanate, diphenyl 4,4'-diisocyanate, azobenzene 4,4'-diisocyanate, diphenylsulphone 4,4'-diisocyanate, dichlorohexamethylene diisocyanate, furfurylidene diisocyanate, 1-chlorobenzene-2,4-diisocyanate, 4,4',4''-triisocyanatotriphenylmethane, 1,3,5-triisocyanato-benzene, 2,4,6-triisocyanato-toluene, tetramethylxylene diisocyanate, poly((phenylisocyanate)-co-formaldehyde), or the like, or a combination comprising at least one of the foregoing polyisocyanate crosslinking agents. An exemplary isocyanate is poly(phenylisocyanate)co-formaldehyde).

The amount of polyisocyanate and the amount of polyamide used in the crosslinking process can be varied depending upon the particular crosslinking agent utilized, the reaction conditions and the particular product application contemplated. In one embodiment, the ratio of —N═C═O groups in the polyisocyanate to the total of amount of hydroxyl groups and amino groups in the polyamide can be varied to achieve a desired level of crosslinking. In one embodiment, at least 4 weight percent of the polyisocyanate to the total amount of polyamide will provide acceptable crosslinking. In one embodiment, enough polyisocyanate is added to the polyamide such that an amount of up to about 30% of the available amino and hydroxyl groups in the polyamide are crosslinked by the —N═C═O groups in the polyisocyanate.

The polyamides can be crosslinked using a polyaldehyde crosslinking agent. Suitable polyaldehyde crosslinking agents are monomeric or oligomeric molecules having 2 or more —CHO groups. In one embodiment, the —CHO groups will crosslink the polyamide between amino groups on the polyamide. Polyaldehyde compounds useful for crosslinking the polyamide include aliphatic and aromatic polyaldehyde compounds having a polyaldehyde functionality of at least 2. The polyaldehyde compound can also comprise mixtures of both aromatic and aliphatic polyaldehydes and polyaldehyde compounds having both aliphatic and aromatic character. Examples of polyaldehyde crosslinking agents include glutaraldehyde, glyoxal, succinaldehyde, 2,6-pyridenedicarboxaldehyde, 3-methyl glutaraldehyde, or the like, or a combination comprising at least one of the foregoing polyaldehyde crosslinking agents.

In one embodiment, the ratio of -CHO groups in the polyaldehyde to the total of amount of amino groups in the polyamide can be varied to achieve a desired level of crosslinking. In one embodiment, the percentage of polyaldehyde to the total amount of amino groups in the polyamide is up to about 30% to provide acceptable crosslinking. In another embodiment, enough polyaldehyde is added to the polyamide such that an amount of up to about 30% of the available amino groups in the polyamide are crosslinked by the —CHO groups in the polyaldehyde.

The polyamide can also be crosslinked using a phosphine crosslinking agent having the general formula $(A)_2P(B)$ and mixtures thereof, wherein A is hydroxyalkyl, and B is hydroxyalkyl, alkyl, or aryl and P is phosphorus. In one embodiment, the A groups will crosslink the polyamide between amino groups on the polyamide to form a Mannich base type linkage —NH—CH$_2$—PRR$_1$, where R and R$_1$ are selected from hydroxy, methyl, hydroxyalkyl, alkyl and aryl groups.

Examples of phosphine crosslinking agents include tris(hydroxymethyl)phosphine, tris(1-hydroxyethyl)phosphine, tris(1-hydroxypropyl)phosphine, bis(hydroxymethyl)-alkylphosphine, bis(hydroxymethyl)-arylphospine, or the like, or a combination comprising at least one of the foregoing phosphine crosslinking agents.

In one embodiment, the ratio of A groups in the phosphine crosslinking agent to the total of amount of amino groups in the polyamide can be varied to achieve a desired level of crosslinking.

The polyamide can also be crosslinked using an epoxy crosslinking agent selected from epoxy resins having more than one epoxide group per molecule and mixtures thereof. An exemplary epoxy crosslinking agent is one having end groups of the formula (V):

the end groups being covalently bonded to carbon, oxygen, nitrogen, sulfur or phosphorus, or mixtures thereof. For example, R may be bisphenol-A. In general, the epoxy crosslinking agents will crosslink the polyamide between amino groups on the polyamide. The crosslinks are formed by attack at the epoxide rings by the amine proton, which opens the epoxide ring forming an —OH group and forming a covalent crosslink between the amine (or amide) and the terminal epoxide carbon.

Examples of epoxy crosslinking agents include polyglycidyl ethers obtainable by reaction of a compound containing at least two free alcoholic hydroxyl and/or phenolic hydroxyl groups per molecule with epichlorohydrin under alkaline conditions. These polyglycidyl ethers may be made from acyclic alcohols, such as ethylene glycol, diethylene glycol, and higher poly(oxyethylene) glycols; from cycloaliphatic alcohols, such as cyclohexanol and 1,2-cyclohexanediol; from alcohols having aromatic nuclei, such as N,N-bis(2-hydroxyethyl)aniline; from mononuclear phenols, such as resorcinol and hydroquinone; and from polynuclear phenols, such as bis(4-hydroxyphenyl)methane, 4,4'-dihydroxydiphenyl, bis(4-hydroxyphenyl) sulfone, 1,1,2,2-tetrakis(4-hydroxyphenyl)ethane, and 2,2,-bis(4-hydroxyphenyl)propane (otherwise known as bisphenol A). In an exemplary embodiment, the epoxy crosslinking agent is a bisphenol-A glycidyl ether terminated resin. In general, the ratio of epoxide groups in the epoxy crosslinking agent to the total of amount of amino groups in the polyamide can be varied to achieve a desired level of crosslinking.

In one embodiment, the organic polymer may be crosslinked using any of the aforementioned crosslinking agents by blending the organic polymer with the crosslinking agent. The blending can be dry blending, melt blending, solution blending or a combination comprising at least one of the foregoing forms of blending.

In solution blending, the organic polymer may be dissolved using a suitable solvent, followed by addition of the crosslinking agent and other desired accelerators, inhibitors, and the like to form a organic polymer-crosslinking agent solution.

Care is taken not to heat this solution above the crosslinking temperature, as premature crosslinking is undesirable. In one embodiment, the organic polymer-crosslinking agent solution can be applied to a substrate and the substrate is heated to complete the crosslinking process and create a crosslinked organic polymer coating on the substrate.

In another embodiment, the solvent from the organic polymer-crosslinking agent solution may be evaporated at a temperature below the crosslinking temperature, and the remaining organic polymer can be molded to form an article having a desired shape or geometry. It is desirable to mold the organic polymer at a temperature below the crosslinking temperature of the organic polymer. The polymeric article may then be crosslinked by subjecting it to heating or to radiation to bring about the desired crosslinking.

In yet another embodiment, the crosslinking agent can be added to the organic polymer in a melt blending process. In this embodiment, the organic polymer and the crosslinking agent can be dry blended to form a organic polymer-crosslinking agent mixture in a device such as a Henschel mixer or a Waring blender prior to being fed to an extruder, where the mixture is melt blended. In another embodiment, a portion of the organic polymer can be premixed with the crosslinking agent to form a dry preblend. The dry preblend is then melt blended with the remainder of the organic polymer in an extruder. In one embodiment, some of the organic polymer can be fed initially at the mouth of the extruder while the remaining portion of the organic polymer is fed through a port downstream of the mouth.

Blending of the composition involves the use of shear force, extensional force, compressive force, ultrasonic energy, electromagnetic energy, thermal energy or combinations comprising at least one of the foregoing forces or forms of energy and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, barrels with pins, rolls, rams, helical rotors, blades, or combinations comprising at least one of the foregoing.

Blending involving the aforementioned forces may be conducted in machines such as single or multiple screw extruders, Buss kneader, Henschel, helicones, Ross mixer, Banbury, roll mills, molding machines such as injection molding machines, vacuum forming machines, blow molding machine, or then like, or combinations comprising at least one of the foregoing machines.

As noted above, the organic polymer can be crosslinked by subjecting it to radiation. The radiation may be ultraviolet radiation, electron beam radiation, x-ray radiation, alpha ray radiation, beta ray radiation, gamma ray radiation, or the like, or a combination comprising at least one of the foregoing types of radiation.

The total amount of radiation can be about 10 to about 500 kiloGrays, specifically about 20 to about 450 kiloGrays, and more specifically about 70 to about 300 kiloGrays for an organic polymer having a cross-sectional area of about 100 square micrometers to about 900 square centimeters, specifically a cross-sectional area of about 200 square micrometers to about 800 square centimeters, specifically a cross-sectional area of about 300 square micrometers to about 100 square centimeters.

The compositions containing crosslinked organic polymers can be advantageously used in frictional applications. In one embodiment, articles manufactured from the composition have a coefficient of friction at room temperature of greater than or equal to about 1.010, specifically greater than or equal to about 1.015, and more specifically greater than or equal to about 1.020, and more specifically greater than or equal to about 1.030 when measured as per ASTM D 3702, using a thrust washer apparatus where the counter stationary surface in the test equipment is made of carbon steel having a Rockwell C hardness of 18 to 22 and a 12 to 16 micro-inch surface finish.

In another embodiment, when subjected to a frictional application at a pressure of about 2 pounds per square inch to about 400 pounds per square inch and a velocity of about 20 feet per minute to about 400 feet per minute, an article manufactured from the composition has a coefficient of friction that is about 10% to about 70% greater, specifically about 20% to about 50% greater, and more specifically about 25% to about 40% greater than a coefficient of friction for a composition comprising the same organic polymer that is not crosslinked; the coefficient of friction being measured in a thrust washer apparatus as per ASTM D-3702, where the counter stationary surface in the test equipment is made of carbon steel having a Rockwell C hardness of 18 to 22 and a 12 to 16 micro-inch surface finish.

In another embodiment, articles manufactured from the composition have a K factor of less than or equal to about $900 \cdot 10^{-3}$ inch$^3$/cal, specifically less than or equal to about $600 \cdot 10^{-3}$ inch$^3$/cal, and more specifically less than or equal to about $300 \cdot 10^{-3}$ inch$^3$/cal when measured as in a thrust washer apparatus as per ASTM D-3702, where the counter stationary surface in the test equipment is made of carbon steel having a Rockwell C hardness of 18 to 22 and a 12 to 16 micro-inch surface finish.

In yet another embodiment, articles manufactured from the composition when subjected to a frictional application at a pressure of about 2 pounds per square inch to about 400 pounds per square inch and a velocity of about 20 feet per minute to about 400 feet per minute, have a K factor of less than or equal to about $6,900 \cdot 10^{-3}$ inch$^3$/cal, specifically less than or equal to about $6,600 \cdot 10^{-3}$ inch$^3$/cal, specifically less than or equal to about $6,300 \cdot 10^{-3}$ inch$^3$/cal, and more specifically less than or equal to about $6,000 \cdot 10^{-3}$ inch$^3$/cal when measured in a thrust washer apparatus as per ASTM D 3702, where the counter stationary surface in the test equipment is comprises carbon steel having a Rockwell C hardness of 18 to 22 and a 12 to 16 micro-inch surface finish.

In one embodiment, an article manufactured from the composition has an increased life cycle (while transferring an equivalent amount of torque or energy) when compared with an article manufactured from a composition that contains non-crosslinked polymers. The life cycle for the article comprising the crosslinked organic polymer is increased by an amount of greater than or equal to about 5%, specifically greater than or equal to about 10%, and more specifically greater than or equal to about 20% than the life cycle of an article manufactured from a comparative composition that comprises the same organic polymer in a non-crosslinked composition.

In one embodiment, an article manufactured from the composition having a lower abrasion rate (weight loss) when compared with an article manufactured from a comparative composition that comprises the same organic polymer in a non-crosslinked composition, can transmit a torque that is in an amount of about 5% to about 50% greater, specifically about 10% to about 40% greater, and more specifically about 15% to about 35% greater than the torque transferred by an article manufactured from the comparative composition.

In another embodiment, an article manufactured from the composition has a lower abrasion rate (weight loss) when compared with an article manufactured from a comparative composition containing a lubricant, can transmit a torque that is in an amount of about 5% to about 50% greater, specifically about 10% to about 40% greater, and more specifically about 15% to about 35% greater than the torque transferred by an article manufactured from a comparative composition that comprises the same organic polymer in a non-crosslinked composition along with the lubricant (e.g., a polyolefin, a polyfluorocarbon, a polysiloxane, or the like). The lubricant may be mixed with the organic polymer in the non-crosslinked composition or can be reacted with the organic polymer (e.g., copolymerized) in the non-crosslinked composition.

As noted above, the articles manufactured from the composition perform well in frictional applications where high pressures and high velocities are desired. In one embodiment, the articles manufactured from the composition are advantageous in that they not undergo catastrophic failure when tested in a thrust washer apparatus as per ASTM D-3702, when subjected to frictional applications that use a pressure of about 2 to about 400 pounds per square inch and a linear velocity of about 20 to about 400 feet per minute for about 1 to about 48 hours, specifically about 4 to about 30 hours and more specifically about 8 to about 24 hours. Improving the ability of an organic polymer to withstand higher pressures, velocities and/or temperatures can in turn permit the material to be used in more demanding applications, where even engineering thermoplastics cannot be used. It can be used to replace metals, permitting weight reduction and allowing for higher design freedom. Moreover, the ability to withstand higher pressures and/or velocities allows for miniaturization of parts, and therefore further weight reduction and design freedom.

In another embodiment, the crosslinked polymers display a gradient in abrasion resistance from the outer crosslinked surface to an inner crosslinked surface. The crosslinked polymers generally display a high abrasion resistance at the outer surface and a lower abrasion resistance at the lower surface.

The following examples, which are meant to be exemplary, not limiting, illustrate compositions and methods of manufacturing of some of the various embodiments of the friction resistant compositions comprising crosslinked organic polymers described herein.

EXAMPLES

Example 1

This example was conducted to demonstrate the difference between frictional properties of a crosslinked and non-crosslinked organic polymeric sample. For this example, Nylon 6,6 was cross-linked via exposure to beta radiation in an electron-beam process to form the composition. A cross-linking agent, i.e. triallyl-isocyanurate (TAIC) was melt mixed with Nylon 6,6. Exposure to radiation via cross-linking was performed on molded parts. The cross-linked parts were exposed to a dose of 100 kiloGrays (kGy). The composition is shown in the Table 1. This composition was manufactured via melt mixing in a twin-screw extruder. The twin-screw extruder was a Clextral 21 having 9 barrels set at temperatures of 100, 280, 280, 280, 280, 280, 280, 280, and 280° C. The screw speed is 120 revolutions per minute. The extruder output is 10 kilograms per hour.

The sample was injection molded to form a test sample. The injection molding machine had three zones set at temperatures of 260 to 280° C. (first zone), 265 to 285° C. (second zone) and 270 to 290° C. (third zone) respectively. The nozzle temperature was set at 275 to 295° C. The melt temperature at the nozzle was 275 to 295° C. The mold temperature was 60 to 95° C. The compression ratio was 2:1 to 2.5:1. The screw was 0.1 to 0.2 meter per seconds.

Tribological properties were tested using a thrust washer apparatus as per ASTM D-3702, the counter stationary surface being carbon steel having a 18 to 22 Rockwell C hardness and a 12 to 16 micro-inch surface finish. As noted above, the sample was crosslinked by subjecting it to radiation. TAIC was used as the crosslinking agent. A non-crosslinked sample was used as a comparative sample. The abrasion tests were conducted at a pressure (P) value of 40 pounds per square (psi) and a linear velocity (V) of 50 feet per minute (feet per minute) respectively and these did not change during the experiments. Results for the abrasion tests are shown later in Table 2.

TABLE 1

| Composition (Commercial Name) | Function and/or Chemical Description | Wt % |
|---|---|---|
| TECHNYL 27 AE1 ® | Nylon 6,6 | 80 |
| TAICROS 5 ® | Cross-linking agent/triallyl-isocyanurate | 5 |
| IRGANOX 1098 ® | Stabilizer and Primary Antioxidant | 0.05 |
| IRGAFOS 168 ® | Secondary Antioxidant | 0.05 |
| Sodium Stearate | Mold release agent | 0.1 |
| BLACK PEARL 800 ® | Colorant | 2 |
| R MOLY CONC. | Masterbatch of molybdenum di-sulfide 35% in Nylon 6,6 65% | 5.7 |
| MILLED DOMANID 33ABH ® | Milled Nylon 6,6 | 7.1 |

A comparison between crosslinked and non-crosslinked samples is shown in Table 2.

TABLE 2

| | Interval | Time Interval (hour) | C.O.F. | K ($10^{-3}$ inch$^3$/cal) | Weight lost rate ($10^{-1}$ mg/hr) |
|---|---|---|---|---|---|
| Crosslinked | 1 | 70.6 | 1.055 | 995 | 4.5 |
| | 2 | 95.3 | 0.983 | 288 | 1.3 |
| | 3 | 119.4 | 1.029 | 377 | 1.7 |
| | 4 | 142.2 | 1.139 | 410 | 1.8 |
| | 5 | 166.3 | 1.021 | 535 | 2.4 |
| Non-crosslinked | 1 | 73.1 | 0.715 | 2616 | 11.7 |
| | 2 | 101.4 | 0.735 | 1824 | 8.2 |
| | 3 | 120.5 | 0.738 | 1926 | 8.6 |
| | 4 | 141.8 | 0.93 | 923 | 4.1 |
| | 5 | 171.1 | 1.008 | 706 | 3.2 |

From the Table 2, it can be seen that the abrasion resistance of the cross-linked nylon 6, 6 is higher than the corresponding value of the non-crosslinked Nylon 6,6. In fact, the weight-loss rate of the non-crosslinked sample is, for each of the 5 intervals defined in the first column of Table 2, higher then the corresponding values measured on the crosslinked sample. This is reflected in the corresponding K factors as well. It can also be seen that the difference between the crosslinked and the non-crosslinked samples is higher at the beginning of the tests and becomes lower as the time for abrasion testing increases.

However, in comparing the abrasion data relative for the last two intervals, i.e., 4 and 5, it can be seen that the non-crosslinked sample shows a total abrasion rate of (4.1+3.2)

$10^{-1} = 7.3 \ 10^{-1}$ milligrams per hour (mg/hr), while the cross-linked sample shows abrasion rate of $(1.8+2.4) 10^{-1} = 4.2 \ 10^{-1}$ mg/hr, which corresponds to 42% reduction in wear.

It is also worth noting that the coefficient of friction (C.O.F.) of the cross-linked sample, for each of the 5-recorded intervals, is higher than the corresponding values of the C.O.F. for the non-crosslinked sample. Higher C.O.F. is beneficial in all applications where torque or force needs to be transmitted.

Example 2

A second set of experiments was performed to test the materials' ability to withstand conditions of high pressure (P) and velocity (V). As will be seen in the Table 3, some of the conditions of pressure (P) and velocity (V) for the Example 2 were greater than those of Example 1. The two materials of Example 1—a crosslinked sample and a non-crosslinked sample were tested for abrasion resistance at increasingly higher pressures and velocity. The test conditions and the results are shown in Table 3.

TABLE 3

|  | Time (h) | Pressure (psi) | Velocity (feet per minute) | K ($10^{-3}$ inch$^3$/cal) | Coefficient of Friction |
| --- | --- | --- | --- | --- | --- |
| Crosslinked | 20.6 | 40 | 100 | 6660 | 0.934 |
|  | 25.9 | 60 | 100 | 7503 | 0.698 |
|  | 2 | 60 | 150 | Machine Stopped Alarm 260° C. | |
| Non-crosslinked | 8 | 40 | 100 | 10034 | 0.874 |
|  | 24.4 | 60 | 100 | Part Cracked | |

A first step consisted in measuring both materials at P of 40 pounds per square inch and V of 100 feet per minute, (this speed corresponds to the double of the speed used for the experiments reported in the Table 2). None of the two materials did show any failure. It is worth noting that, also at these P and V conditions, the k factor of the crosslinked sample (6.660 inch$^3$/cal) was lower then the k factor of the non-crosslinked sample (10.034 inch$^3$/cal), which corresponds to a reduction of 34% due to cross-linking.

When P was increased to 60 pounds per square inch (linear velocity (V) was kept at 100 feet per minute), the non-crosslinked sample failed, showing evident cracking, as can be seen in the FIG. 1, while the cross-linked sample did not show any evidence of failure after more the 24 hours of testing. The FIG. 1 is a photograph showing the cracked non-crosslinked sample and the crosslinked sample next to it, with no visible damage. As can be seen in the FIG. 1, the crosslinked sample does not have any cracks. These results indicate that the cross-linked sample can withstand higher P—V values than the non-crosslinked sample. The cross-linked sample therefore does not undergo the catastrophic failure that the non-crosslinked sample undergoes.

The non-crosslinked ring failed when tested at P of 60 pounds per square inch and V of 100 feet per minute. The cross-linked ring, on the other hand, even after being tested at V of 150 feet per minute and P of 60 pounds per square inch, shows no cracking. When tested at the mentioned P—V conditions, the temperature reached 260° C. This temperature corresponds to the safety alarm temperature of the testing equipment and to the melting point of Nylon 6,6. Even at these severe conditions of temperature, pressure and velocity, the sample did not show any cracking.

As mentioned above, this data set indicates that crosslinking allows an improvement of the abrasion resistance even when the pressure and velocity are increased during an abrasion resistance test. Improving the ability of an organic polymer to withstand higher pressures, velocities and/or temperatures can in turn permit the material to be used in more demanding applications, where even engineering thermoplastics cannot be used. It can be used to replace metals, permitting weight reduction and allowing for higher design freedom. Moreover, the ability to withstand higher pressures and/or velocities allows for miniaturization of parts, and therefore further weight reduction and design freedom.

The tribological improvement illustrated above can be combined with other advantageous properties of the crosslinked organic polymers. Cross-linking reduces the corresponding coefficient of thermal expansion (CTE) of polymers when compared with non-crosslinked polymers. The values for CTEs of polymers are around 40 to 60 ppm/° C., and are generally higher than the values for CTEs of metal (15 to 25 ppm/° C.). The high CTE of polymers limit their usage in applications where they contact metallic parts. In the case of crosslinked polymers, the improved tribological properties, combined with the lower CTE can increase the possibility of replacing metal parts with crosslinked organic polymer parts thereby giving rise to a wider range of applications. Another advantage of crosslinking organic polymers is the reduced moisture uptake (when compared with non-crosslinked polymers) and therefore more stable performance under a variety of conditions of external humidity.

In one embodiment, the CTE of the composition comprising the crosslinked organic polymer is up to about 10% lower, specifically up to about 20% lower, and more specifically up to about 50% lower than the CTE of a composition that does not contain a crosslinked organic polymer. In another embodiment, the moisture uptake of the composition comprising the crosslinked organic polymer is reduced by an amount of up to about 3%, specifically up to about 5%, and more specifically up to about 20% over a composition that does not contain a crosslinked organic polymer.

The composition containing the crosslinked polymer can also advantageously be used in frictional applications where dimensional stability is desired. For example, when the composition is used in machine components such as gears, cams, worm wheels, piston rods, and the like, the component does not suffer deformation during operational increases in temperature because of the crosslinking. The ability of crosslinked organic polymers to retain dimensional stability prevents the seizing-up or sticking of machine parts to one another. For example in a gear box, dimensional stability ensures that gears mesh with each other and also ensure that the gear continues to rotate about is shaft (axis). This ability of crosslinked polymers to maintain dimensional stability improves the life cycle of the machines and reduces downtime due to maintenance of machine parts that is otherwise required.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A crosslinked organic polymer:
the crosslinked organic polymer being at a temperature below its glass transition temperature; where the crosslinked organic polymer is a polyacetal, a polyacrylic, a polycarbonate, a polyester, a polyamide, a polyamideimide, a polyarylate, a polyarylsulfone, a polyethersulfone, a polyphenylene sulfide, a polysulfone, a polyimide, a polyetherimide, a polyetherketone, a polyether etherketone, a polyether ketone ketone, a polybenzoxazole, a polyphthalide, a polyanhydride, a polyvinyl ether, a polyvinyl thioether, a polyvinyl alcohol, a polyvinyl ketone, a polyvinyl nitrile, a polyvinyl ester, a polysulfonate, a polysulfide, a polythioester, a polysulfone, a polysulfonamide, a polyurea, a polyphosphazene, a polysilazane, or a combination thereof;
where the polyamide is polypyrrolidone, polycaprolactam, polytetramethylene adipamide, polycapryllactam, polyhexamethylene adipamide, polyundecanolactam, polydodecanolactam, polyhexamethylene azelaiamide, polyhexamethylene sebacamide, polyhexamethylene isophthalamide, polyhexamethylene terephthalamide, polyphthalamide, or a combination thereof;
wherein a composition comprising the crosslinked organic polymer has a coefficient of friction that is about 10% to about 70% greater than a coefficient of friction for a composition comprising the same organic polymer that is not crosslinked; and wherein a composition comprising the crosslinked organic polymer has a lower K factor than a K factor of a composition comprising the same organic polymer that is not crosslinked; the coefficient of friction and the K factor being measured in a thrust washer apparatus as per ASTM D-3702, where the counter stationary surface in the thrust washer apparatus comprises carbon steel having a Rockwell C hardness of 18 to 22 and a 12 to 16 micro-inch surface finish.

2. The crosslinked organic polymer of claim 1, where the crosslinked organic polymer is the reaction product of an organic polymer with a crosslinking agent.

3. The crosslinked organic polymer of claim 2, where the crosslinking agent is a cyanurate crosslinking agent, an isocyanate crosslinking agent, a polyaldehyde crosslinking agent, a phosphine crosslinking agent, an epoxy crosslinking agent, or a combination thereof.

4. The crosslinked organic polymer of claim 1, where the crosslinked organic polymer is obtained by exposing an organic polymer to radiation.

5. The crosslinked organic polymer of claim 4, where the radiation is xray radiation, electron beam radiation, gamma radiation, beta radiation, ultraviolet radiation, alpha radiation, or a combination thereof.

6. The crosslinked organic polymer of claim 4, where a radiation dosage is about 10 to about 500 kiloGrays per unit cross-sectional area of about 100 square micrometers to about 900 square centimeters.

7. The crosslinked organic polymer of claim 1, where the crosslinked organic polymer comprises a gradient in crosslink density.

8. The crosslinked organic polymer of claim 1, wherein a composition comprising the crosslinked organic polymer comprises a gradient in the coefficient of friction.

9. The crosslinked organic polymer of claim 1, wherein a composition comprising the crosslinked organic polymer comprises a gradient in the K factor across a cross-sectional area.

10. The crosslinked organic polymer of claim 1, wherein a composition comprising the crosslinked organic polymer has a K factor of about $1,000.10^{-3}$ inch$^3$/cal or less.

11. An article comprising the composition comprising the crosslinked organic polymer of claim 1.

12. A crosslinked organic polymer:
where the crosslinked organic polymer is a polyamide being at a temperature below its glass transition temperature, where the polyamide is polypyrrolidone, polycaprolactam, polytetramethylene adipamide, polycapryllactam, polyhexamethylene adipamide, polyundecanolactam, polydodecanolactam, polyhexamethylene azelaiamide, polyhexamethylene sebacamide, polyhexamethylene isophthalamide, polyhexamethylene terephthalamide, polyphthalamide, or a combination thereof;
wherein a composition comprising the crosslinked organic polymer has a coefficient of friction that is about 10% to about 70% greater than a coefficient of friction for a composition comprising the same organic polymer that is not crosslinked; and wherein a composition comprising the crosslinked organic polymer has a lower K factor than a K factor of a composition comprising the same organic polymer that is not crosslinked; the coefficient of friction and the K factor being measured in a thrust washer apparatus as per ASTM D-3702.

13. The crosslinked organic polymer of claim 12, where the crosslinked organic polymer comprises a gradient in crosslink density.

14. The crosslinked organic polymer of claim 12, wherein a composition comprising the crosslinked organic polymer comprises a gradient in coefficient of friction.

15. The crosslinked organic polymer of claim 12, wherein a composition comprising the crosslinked organic polymer comprises a gradient in K factor across a cross-sectional area.

16. An article comprising the composition comprising the crosslinked organic polymer of claim 12.

17. The article of claim 11, where the article is a gear, a cam, a worm wheel, or a piston rod.

18. The article of claim 11, where the article is a component in a machine.

19. The article of claim 16, where the article is a gear, a cam, a worm wheel, or a piston rod.

20. The article of claim 16, where the article is a component in a machine.

* * * * *